US010994839B2

(12) United States Patent
Kooiman et al.

(10) Patent No.: US 10,994,839 B2
(45) Date of Patent: May 4, 2021

(54) SYSTEM AND METHOD FOR ROTATING A ROTOR OF A TILTROTOR AIRCRAFT

(71) Applicant: Bell Helicopter Textron Inc., Fort Worth, TX (US)

(72) Inventors: James Everett Kooiman, Fort Worth, TX (US); Michael E. Rinehart, Euless, TX (US); Jeffrey Matthew Williams, Hudson Oaks, TX (US)

(73) Assignee: TEXTRON INNOVATIONS INC., Fort Worth, TX (US)

( * ) Notice: Subject to any disclaimer, the term of this patent is extended or adjusted under 35 U.S.C. 154(b) by 559 days.

(21) Appl. No.: 16/050,185

(22) Filed: Jul. 31, 2018

(65) Prior Publication Data
US 2020/0039642 A1 Feb. 6, 2020

(51) Int. Cl.
*B64C 29/00* (2006.01)
(52) U.S. Cl.
CPC ................. *B64C 29/0033* (2013.01)
(58) Field of Classification Search
CPC .................................................. B64C 29/0033
See application file for complete search history.

(56) References Cited

U.S. PATENT DOCUMENTS

| 1,846,992 | A | | 2/1932 | Cecil | |
| 2,450,821 | A | * | 10/1948 | Zimmerman | ....... B64C 29/0033 244/12.1 |
| 2,621,001 | A | * | 12/1952 | Roman | ............... B64C 29/0033 244/7 C |
| 2,814,451 | A | | 11/1957 | Turner et al. | |
| 2,936,967 | A | | 5/1960 | Dancik | |
| 2,936,968 | A | | 5/1960 | Mazzitelli | |
| 2,961,189 | A | * | 11/1960 | Doak | .................. B64C 29/0033 244/12.4 |
| 3,065,929 | A | | 11/1962 | Holland | |
| 3,106,369 | A | | 10/1963 | Borst | |
| 3,107,882 | A | | 10/1963 | Matteson et al. | |
| 3,181,810 | A | | 5/1965 | Olson | |
| 3,197,157 | A | * | 7/1965 | King | .................. B64C 29/0033 244/7 C |
| 3,259,343 | A | | 7/1966 | Roppel | |

(Continued)

FOREIGN PATENT DOCUMENTS

EP 2484587 A1 8/2012
WO 2006041455 A1 4/2006
(Continued)

OTHER PUBLICATIONS

EPO Examination Report issued in EP Application 19179165.6 dated Jan. 29, 2020, 7 pages.
(Continued)

*Primary Examiner* — Joseph W Sanderson
(74) *Attorney, Agent, or Firm* — Patent Capital Group

(57) ABSTRACT

A tiltrotor aircraft includes a rotor system, a pylon coupled to the rotor system, a spindle coupled to the pylon, an actuator arm coupled to the spindle, and an actuator. The actuator can cause the actuator arm to rotate, thereby causing the spindle to rotate the pylon and the rotor system. The actuator is in front of a forward spar of the wing of the tiltrotor aircraft and the actuator arm is about one-half (0.5) of an inch to about five (5) inches from the wing.

20 Claims, 15 Drawing Sheets

(56) References Cited

U.S. PATENT DOCUMENTS

| | | | |
|---|---|---|---|
| 3,266,754 A * | 8/1966 | King | B64C 29/0033 244/231 |
| 3,284,027 A | 11/1966 | Marc | |
| 3,360,217 A | 12/1967 | Trotter | |
| 3,666,209 A | 5/1972 | Taylor | |
| 3,703,832 A | 11/1972 | Lindsey et al. | |
| 3,797,783 A | 3/1974 | Kisovec | |
| 4,136,845 A | 1/1979 | Eickmann | |
| 4,142,697 A | 3/1979 | Fradenburgh | |
| 4,245,804 A | 1/1981 | Ishimitsu et al. | |
| 4,436,261 A | 3/1984 | Koleff | |
| 4,496,120 A | 1/1985 | Eickmann | |
| 4,682,512 A | 7/1987 | Peterson | |
| 4,691,878 A | 9/1987 | Vaughan et al. | |
| 4,783,023 A | 11/1988 | Jupe | |
| 4,979,698 A | 12/1990 | Lederman | |
| 5,054,716 A | 10/1991 | Wilson | |
| 5,085,315 A | 2/1992 | Sambell | |
| 5,092,539 A * | 3/1992 | Caero | B64C 27/28 244/99.9 |
| 5,096,140 A | 3/1992 | Dornier et al. | |
| 5,141,176 A | 8/1992 | Kress et al. | |
| 5,645,250 A | 7/1997 | Gevers | |
| 5,749,540 A | 5/1998 | Arlton | |
| 5,868,351 A | 2/1999 | Stamps et al. | |
| 6,030,177 A | 2/2000 | Hager | |
| 6,220,545 B1 | 4/2001 | Fenny et al. | |
| 6,247,667 B1 * | 6/2001 | Fenny | B64C 29/0033 244/56 |
| 6,260,793 B1 * | 7/2001 | Balayn | B64C 7/00 244/130 |
| 6,276,633 B1 * | 8/2001 | Balayn | B64C 27/12 244/56 |
| 6,367,736 B1 * | 4/2002 | Pancotti | B64C 29/0033 244/48 |
| 6,607,161 B1 | 8/2003 | Krysinski et al. | |
| 6,843,447 B2 | 1/2005 | Morgan | |
| 7,306,186 B2 * | 12/2007 | Kusic | B64C 29/0033 244/17.23 |
| 7,520,041 B1 | 4/2009 | Aguilar | |
| 7,866,598 B2 | 1/2011 | Waide et al. | |
| 7,871,033 B2 * | 1/2011 | Karem | B64C 27/08 244/7 A |
| 7,874,513 B1 | 1/2011 | Smith | |
| 7,913,947 B2 * | 3/2011 | Haynes | B64C 29/0033 244/56 |
| 8,152,096 B2 | 4/2012 | Smith | |
| 8,292,216 B1 | 10/2012 | Rumberger, Jr. | |
| 8,322,647 B2 * | 12/2012 | Amraly | B64D 35/04 244/12.4 |
| 8,366,049 B2 * | 2/2013 | Karem | B64C 29/0033 244/137.1 |
| 8,602,347 B2 * | 12/2013 | Isaac | B64D 35/04 244/7 A |
| 8,636,473 B2 | 1/2014 | Brunken, Jr. | |
| 8,733,690 B2 | 5/2014 | Bevirt et al. | |
| 8,960,591 B2 * | 2/2015 | Pancotti | B64C 29/0033 244/7 C |
| 9,126,678 B2 | 9/2015 | Ross et al. | |
| 9,199,732 B2 * | 12/2015 | Isaac | B64D 35/00 |
| 9,475,585 B2 | 10/2016 | Hong et al. | |
| 9,663,225 B1 | 5/2017 | Kooiman et al. | |
| 9,694,911 B2 * | 7/2017 | Bevirt | B64C 29/0033 |
| 9,783,292 B2 | 10/2017 | Kooiman et al. | |
| 9,809,318 B1 | 11/2017 | Williams et al. | |
| 9,856,029 B2 | 1/2018 | King et al. | |
| 9,868,541 B2 | 1/2018 | Kooiman et al. | |
| 9,868,542 B2 | 1/2018 | Williams et al. | |
| 9,889,927 B2 | 2/2018 | Modrzejewski et al. | |
| 9,981,734 B2 | 5/2018 | Ivans et al. | |
| 10,011,349 B2 | 7/2018 | Ivans et al. | |
| 10,279,892 B2 | 5/2019 | Bosworth | |
| 10,279,901 B2 | 5/2019 | Ivans et al. | |
| 10,486,806 B2 * | 11/2019 | Alber | B64C 29/0033 |
| D870,639 S | 12/2019 | Ivans et al. | |
| 10,589,838 B1 | 3/2020 | Suppes | |
| 10,633,092 B2 | 4/2020 | Willford | |
| 2002/0100835 A1 * | 8/2002 | Kusic | B64C 29/0033 244/17.23 |
| 2004/0038768 A1 | 2/2004 | Thomassey et al. | |
| 2005/0045762 A1 | 3/2005 | Pham | |
| 2005/0127238 A1 | 6/2005 | Ballew | |
| 2005/0230520 A1 * | 10/2005 | Kusic | B64C 27/08 244/12.4 |
| 2006/0151272 A1 | 7/2006 | Smith et al. | |
| 2007/0102573 A1 | 5/2007 | Goto | |
| 2007/0158494 A1 | 7/2007 | Burrage | |
| 2007/0205325 A1 | 9/2007 | Waide | |
| 2007/0241228 A1 * | 10/2007 | Haynes | B64C 29/0033 244/7 A |
| 2009/0227415 A1 | 9/2009 | Buelna | |
| 2009/0256026 A1 * | 10/2009 | Karem | B64C 27/08 244/99.2 |
| 2009/0266941 A1 | 10/2009 | Karem | |
| 2009/0266942 A1 | 10/2009 | Karem | |
| 2010/0171001 A1 * | 7/2010 | Karem | B64D 1/08 244/7 R |
| 2010/0276549 A1 | 11/2010 | Karem | |
| 2010/0327123 A1 | 12/2010 | Smith et al. | |
| 2011/0284684 A1 * | 11/2011 | Amraly | B64D 35/04 244/12.4 |
| 2011/0315827 A1 | 12/2011 | Collins et al. | |
| 2012/0199699 A1 * | 8/2012 | Isaac | B64C 29/0033 244/7 R |
| 2012/0211608 A1 * | 8/2012 | Pancotti | B64C 29/0033 244/7 C |
| 2013/0026302 A1 | 1/2013 | Lee et al. | |
| 2013/0026303 A1 * | 1/2013 | Wang | B64C 29/0033 244/7 R |
| 2013/0078100 A1 | 3/2013 | Baskin et al. | |
| 2013/0099065 A1 | 4/2013 | Stuhlberger | |
| 2014/0034781 A1 | 2/2014 | Kouros et al. | |
| 2014/0061392 A1 | 3/2014 | Karem | |
| 2014/0217243 A1 * | 8/2014 | Isaac | B64D 35/08 244/7 A |
| 2014/0263854 A1 | 9/2014 | Ross et al. | |
| 2015/0048213 A1 | 2/2015 | Ross et al. | |
| 2015/0048214 A1 | 2/2015 | Bockmiller et al. | |
| 2015/0266571 A1 * | 9/2015 | Bevirt | B64C 11/28 244/7 C |
| 2015/0360774 A1 | 12/2015 | Covington et al. | |
| 2016/0026190 A1 | 1/2016 | Kowalski et al. | |
| 2016/0122039 A1 | 5/2016 | Ehinger et al. | |
| 2016/0229531 A1 | 8/2016 | Robertson et al. | |
| 2016/0304194 A1 * | 10/2016 | Bevirt | B64C 27/30 |
| 2017/0137122 A1 | 5/2017 | Kooiman et al. | |
| 2017/0158323 A1 | 6/2017 | Ross et al. | |
| 2017/0217598 A1 | 8/2017 | Bacon et al. | |
| 2017/0259521 A1 | 9/2017 | Kooiman et al. | |
| 2017/0259904 A1 | 9/2017 | Kooiman et al. | |
| 2017/0259905 A1 | 9/2017 | Kooiman et al. | |
| 2018/0079485 A1 | 3/2018 | Kooiman et al. | |
| 2018/0079486 A1 | 3/2018 | Kooiman et al. | |
| 2018/0079499 A1 | 3/2018 | Foskey | |
| 2018/0086446 A1 * | 3/2018 | Alber | B64C 5/02 |
| 2018/0251227 A1 | 9/2018 | Ross et al. | |
| 2018/0297695 A1 * | 10/2018 | Ramirez-Serrano | B64C 27/82 |
| 2018/0312251 A1 | 11/2018 | Petrov | |
| 2018/0370624 A1 | 12/2018 | Seale et al. | |
| 2019/0248483 A1 | 8/2019 | Przybyla et al. | |
| 2019/0256190 A1 | 8/2019 | Olson et al. | |
| 2019/0257425 A1 | 8/2019 | Gilliland | |
| 2019/0277392 A1 | 9/2019 | Gilliland | |
| 2019/0323563 A1 | 10/2019 | Gilliland et al. | |
| 2019/0337629 A1 | 11/2019 | Gilliland et al. | |
| 2019/0338810 A1 | 11/2019 | Gilliland et al. | |
| 2019/0344877 A1 | 11/2019 | Gilliland et al. | |
| 2019/0389571 A1 | 12/2019 | Gilliland et al. | |
| 2019/0389572 A1 | 12/2019 | Gilliland et al. | |

(56) References Cited

U.S. PATENT DOCUMENTS

2020/0031488 A1* 1/2020 King ................... B64C 29/0033
2020/0156780 A1* 5/2020 Varigas ................... B64C 25/04

FOREIGN PATENT DOCUMENTS

WO     2009126905 A1    10/2009
WO     2016062223 A1     4/2016

OTHER PUBLICATIONS

EPO Search Report issued in EP Application 19179165.6 dated Dec. 20, 2019, 5 pages.
USPTO Non-Final Office Action for U.S. Appl. No. 16/047,503 dated Nov. 2, 2020, 22 pages.

* cited by examiner

SYSTEM AND METHOD FOR ROTATING A ROTOR OF A TILTROTOR AIRCRAFT

TECHNICAL FIELD

This disclosure relates generally to aircraft mounts, and more particularly, though not exclusively, to a system and method for rotating a rotor of a tiltrotor aircraft.

BACKGROUND

Aircraft are subjected to various aerodynamic and operational forces during operation. For example, the aerodynamic forces involved during operation of a rotorcraft may include thrust, drag, lift, and weight. In certain circumstances, aerodynamic and operational forces may increase the structural load on components of an aircraft and may also cause vibration. Excessive loads during operation of an aircraft (e.g., torsion and bending of the empennage of a helicopter) are undesirable and potentially harmful to the aircraft, as they can negatively impact the structural integrity, mechanical integrity, and performance of the aircraft. In addition, the design of tiltrotor aircraft poses unique problems not associated with either helicopters or propeller driven aircraft. In particular, the tiltrotor assemblies (pylons or nacelles) must be articulated and rotate between a helicopter mode and an airplane mode.

SUMMARY

According to one aspect of the present disclosure, a tiltrotor aircraft can include a rotor system, a pylon coupled to the rotor system, a spindle coupled to the pylon, an actuator arm coupled to the spindle, and an actuator coupled to the actuator arm, where the actuator causes the spindle to rotate the pylon and the rotor system. The spindle can be partially located in a wing of the tiltrotor aircraft and the actuator arm and actuator are outside and proximate to the wing. The actuator can be positioned forward of a forward spar of the wing.

In some examples, the actuator arm is between about one-half (0.5) of an inch to about five (5) inches from the wing. The tiltrotor aircraft can further include a down stop mounted to an end of the wing, where the down stop includes a down stop striker and where the actuator arm includes a down stop block that has a profile that mates with a profile of the down stop striker. In some examples, the profile of the down stop block is an inverted "V" profile. Also, a center of the down stop can be about twenty (20) inches to about twenty-four (24) inches from a center of the spindle. The actuator arm can be coupled to the rotor system using a horizontal support and the horizontal support reacts to inboard/outboard loads and the down stop striker and down stop block reacts to vertical loads. In some examples, the actuator arm and the pylon are splined.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1A:
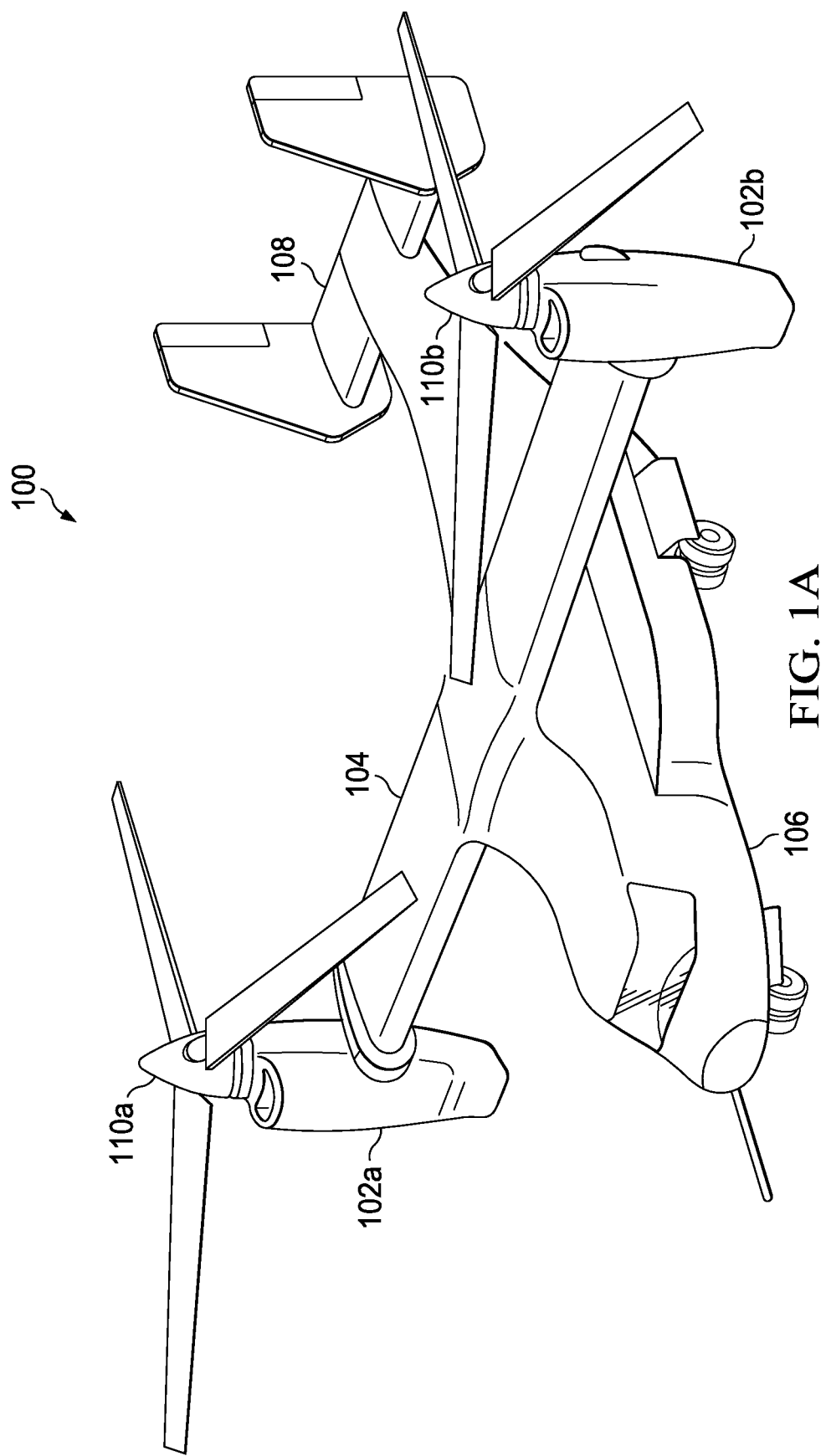
FIGS. 1A-1D illustrate an example tiltrotor aircraft in accordance with certain embodiment.

The FIGURES of the drawings are not necessarily drawn to scale, as their dimensions can be varied considerably without departing from the scope of the present disclosure.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, as referred to herein in this Specification, the terms 'forward', 'aft', 'inboard', and 'outboard' may be used to describe relative relationship(s) between components and/or spatial orientation of aspect(s) of a component or components. The term 'forward' may refer to a special direction that is closer to a front of an aircraft relative to another component or component aspect(s). The term 'aft' may refer to a special direction that is closer to a rear of an aircraft relative to another component or component aspect(s). The term 'inboard' may refer to a location of a component that is within the fuselage of an aircraft and/or a spatial direction that is closer to or along a centerline of the aircraft relative to another component or component aspect, where the centerline runs between the front and the rear of the aircraft. The term 'outboard' may refer to a location of a component that is outside the fuselage of an aircraft and/or a special direction that farther from the centerline of the aircraft relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Example embodiments that may be used to implement the features and functionality of this disclosure will now be described with more particular reference to the attached FIGURES.

Figure 1B:
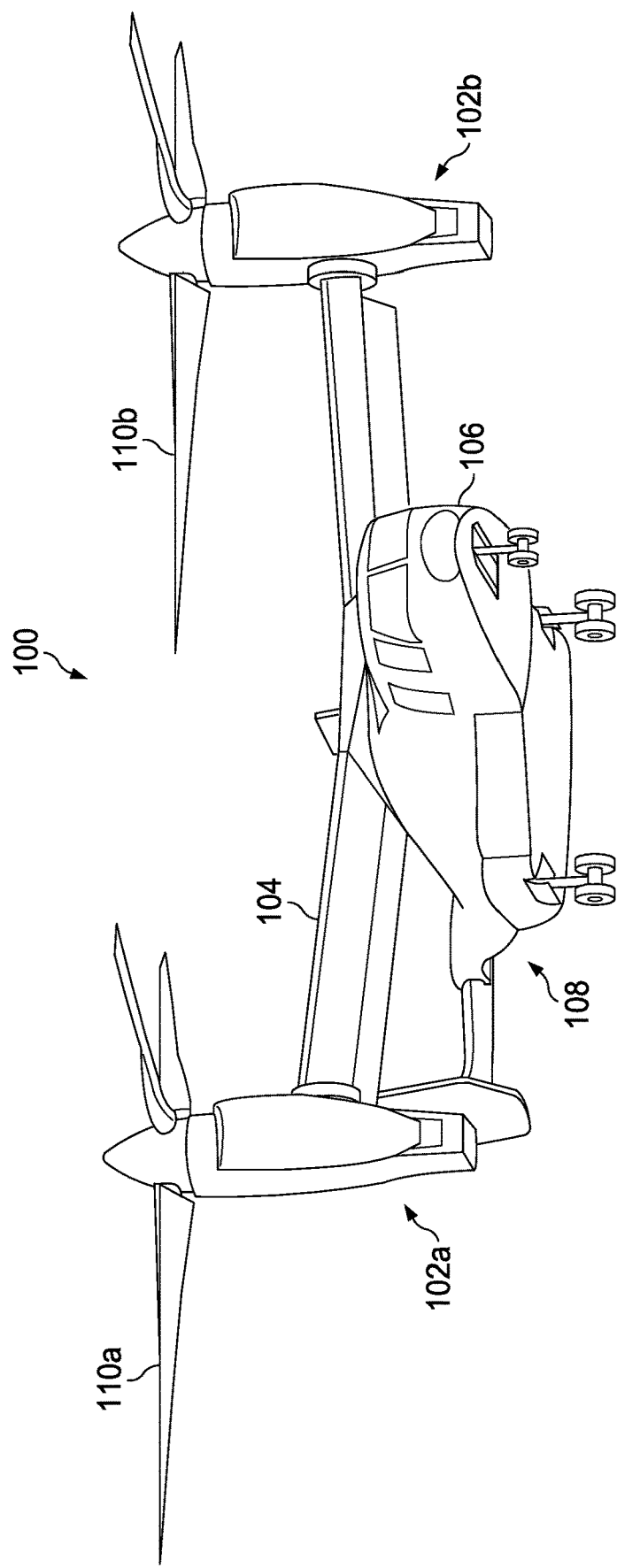
Figure 1C:
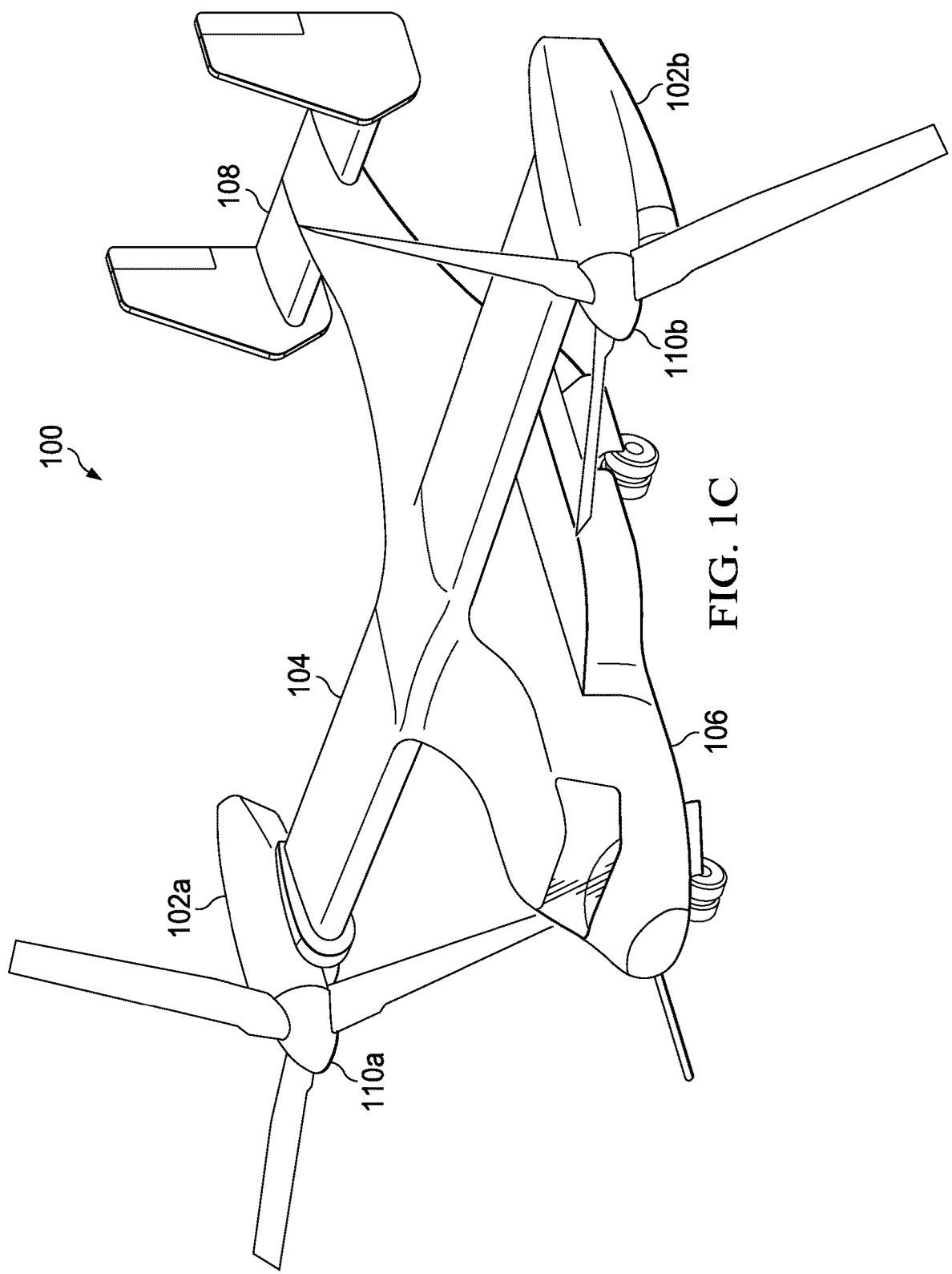
Figure 1D:
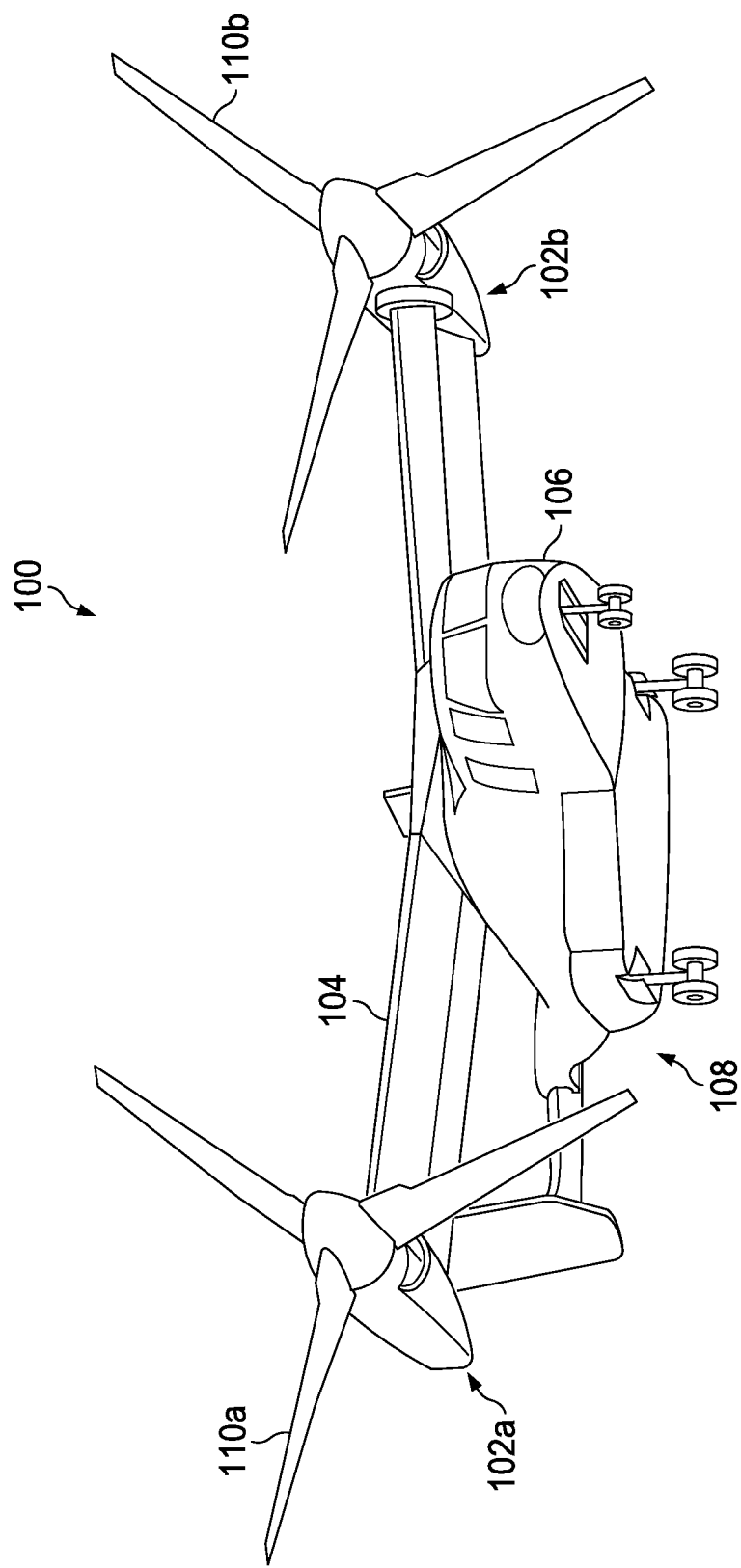

FIGS. 1A-1D illustrate an example embodiment of a tiltrotor aircraft 100. For example, FIGS. 1A and 1B illustrate a perspective view of tiltrotor aircraft 100, in a helicopter mode or helicopter configuration. FIGS. 1C and 1D illustrate a perspective view of tiltrotor aircraft 100 in an airplane mode or airplane configuration.

Tiltrotor aircraft 100 can include pylons 102a and 102b, a wing 104, a fuselage 106, and a tail member 108. Each pylon 102a and 102b can include a gearbox for driving rotor systems 110a and 110b, respectively. Pylons 102a and 102b can be located at each of the ends of wing 104 and can rotate on the ends of wing 104 through a range of rotation up to about one hundred degrees. Pylons 102a and 102b provide a rotatable support for rotor systems 110a and 110b respectively. More specifically, pylons 102a and 102b are each configured to rotate between a helicopter mode, as illustrated in FIGS. 1A and 1B, in which pylons 102a and 102b are approximately vertical, and an airplane mode, illustrated in FIGS. 1C and 1D, in which pylons 102a and 102b are approximately horizontal.

While tiltrotor aircraft 100 is shown with pylons 102a and 102b located at the ends of wing 104, other configurations may be used. For example, a configuration may be used in which the pylons or nacelles (e.g., structures similar to pylons 102a and 102b that include an engine) are rotatably connected to the fuselage. In an example, tiltrotor aircraft 100 can be configured as an unmanned aerial vehicle (UAV), as opposed to a manned vehicle, and therefore has no provision for onboard human pilots. In addition, nacelles may be used instead of pylons 102a and 102b.

Tiltrotor aircraft 100 can be a tiltrotor aircraft. Tiltrotor aircraft are hybrids between traditional helicopters and traditional propeller driven aircraft. Typical tiltrotor aircraft have rotor systems that are capable of articulating relative to the aircraft fuselage. This articulating portion is commonly referred to as a nacelle if the articulating portion includes an engine or a pylon if the articulating portion does not include an engine. Tiltrotor aircraft are capable of converting from a helicopter mode, as illustrated in FIGS. 1A and 1B, in which the aircraft can take-off, hover, and land like a helicopter, to an airplane mode, illustrated in FIGS. 1C and 1D, in which the aircraft can fly forward like a fixed-wing airplane.

It should be appreciated that tiltrotor aircraft 100 of FIGS. 1A-1D are merely illustrative of a variety of aircraft that can be used to implement embodiments of the present disclosure. Other aircraft implementations can include, for example, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

The design of tiltrotor aircraft poses unique problems not associated with either helicopters or propeller driven aircraft. In particular, the tiltrotor assemblies must be articulated between helicopter mode and airplane mode. To convert between helicopter mode and airplane mode the pylons or nacelles must rotate relative to the fuselage.

Tiltrotor aircraft 100 can be subjected to various aerodynamic and operational forces during operation such as thrust or torque loads, conversion actuator pre-load forces, aerodynamic shears, and so forth. Thrust or torque loads, for example, are forces produced by the rotation of rotor systems 110a and 110b. In another example, when in airplane mode, an actuator (e.g., actuator 116 illustrated in FIG. 2) may provide a downward pre-loaded force that maintains the position of rotor systems 110a and 110b in airplane mode. More specifically, the actuator can be configured to provide a downward force to pre-load the pylon or nacelle against the wing to better maintain the pylon's or nacelle's position in airplane mode. In yet another example, operational failures and/or malfunctions of components may result in unintended forces being caused to propulsion system components. For example, the actuator may malfunction in a 'worst-case' scenario and rather than applying normal pre-load forces, which typically range around five thousand (5,000) pounds of downward force, the actuator can drive a download striker into a down stop at forces up to or greater than forty thousand (40,000) pounds of force.

Thus, it is important to provide structural and mechanical support for components of tiltrotor aircraft 100 to facilitate flight capabilities of tiltrotor aircraft 100. Design of components that are used to provide structural and mechanical support for tiltrotor aircraft 100 can implicate numerous considerations (e.g., performance considerations, manufacturing considerations, etc.), such as weight, failure, 'worst-case', damage or wear rate, cost, part count, among others, and can be a challenging aspect of tiltrotor aircraft design.

A possible solution to help articulate the tiltrotor assemblies between helicopter mode and airplane mode and provide structural and mechanical support for components of tiltrotor aircraft 100 is an actuator arm coupled to a spindle. The spindle can be coupled to a pylon and the pylon can be coupled to a rotor system. The actuator arm can be used to rotate the spindle (and therefore rotate the pylon and rotor system) to help articulate the tiltrotor assemblies between helicopter mode and airplane mode. In some examples, the actuator arm can be about one-half (0.5) of an inch to about five (5) inches from the wing(s) (e.g., wing 104) of tiltrotor aircraft 100. In a specific example, the actuator arm is about 0.75 to about 1.25 inches from the wing(s) of tiltrotor aircraft 100. In another specific example, the actuator arm is about one (1) inch from the wing(s) of tiltrotor aircraft 100. In yet another specific example, the actuator arm may be no longer than about thirty-five (35) inches in total length. In another specific example, the actuator arm may be between about thirty-two (32) inches to about thirty-four (34) inches in total length.

It is to be understood that other embodiments may be utilized and structural changes may be made without departing from the scope of the present disclosure. Substantial flexibility is provided by tiltrotor aircraft 100 in that any suitable arrangements and configuration may be provided without departing from the teachings of the present disclosure.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

Figure 2:
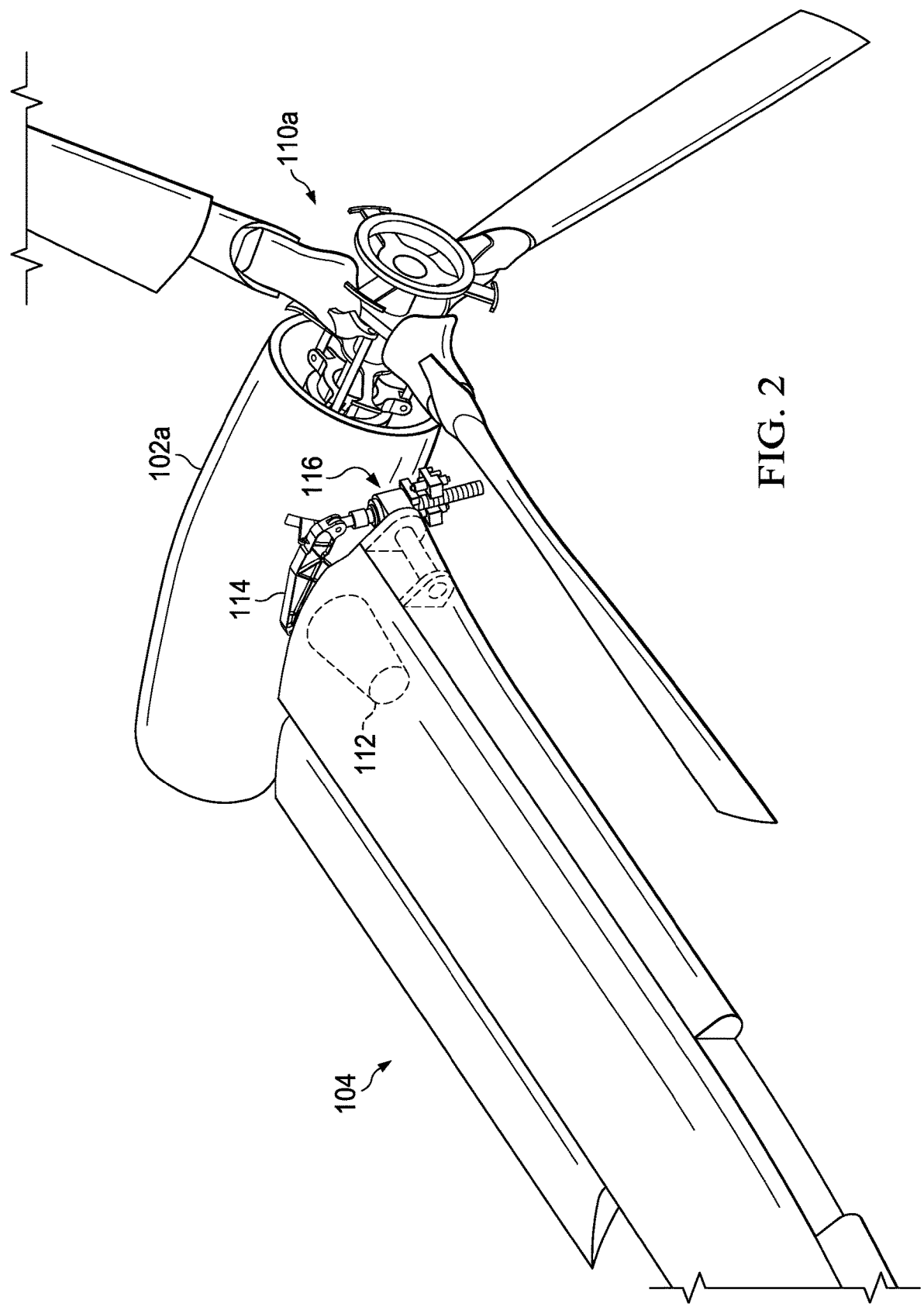
FIG. 2 illustrates an example portion of a tiltrotor aircraft in accordance with certain embodiments.

Turning to FIG. 2, FIG. 2 illustrates a portion of tiltrotor aircraft 100. Tiltrotor aircraft 100 can include pylon 102a, wing 104, a spindle 112, an actuator arm 114, and an actuator 116. Pylon 102a can include rotor system 110a. Spindle 112 is coupled to pylon 102a and can be a casted structure. Actuator arm 114 is coupled to spindle 112 and can be a bell crank. Actuator 116 is coupled to actuator arm 114 and can be a linear actuator, telescoping ball screw, or some other type of mechanism that can cause actuator arm 114 to rotate spindle 112, which in turn rotates pylon 102a. As pylon 102a rotates, the direction of force from rotor system 110a changes and allows tiltrotor aircraft 100 to be capable of converting from helicopter mode, as illustrated in FIGS. 1A and 1B, to airplane mode, illustrated in FIGS. 1C and 1D, and back to helicopter mode. In some examples, actuator arm 114 can be about one-half (0.5) of an inch to about five (5) inches from wing 104. In a specific example, actuator arm 114 is about 0.75 to about 1.25 inches from wing 104. In another specific example, actuator arm 114 is about one (1) inch from wing 104. Also, in some examples, actuator arm 114 may be no longer than about thirty-five (35) inches in total length. In a specific example, actuator arm 114 is between about thirty-two (32) inches to about thirty-four (34) inches in total length.

Figure 3:
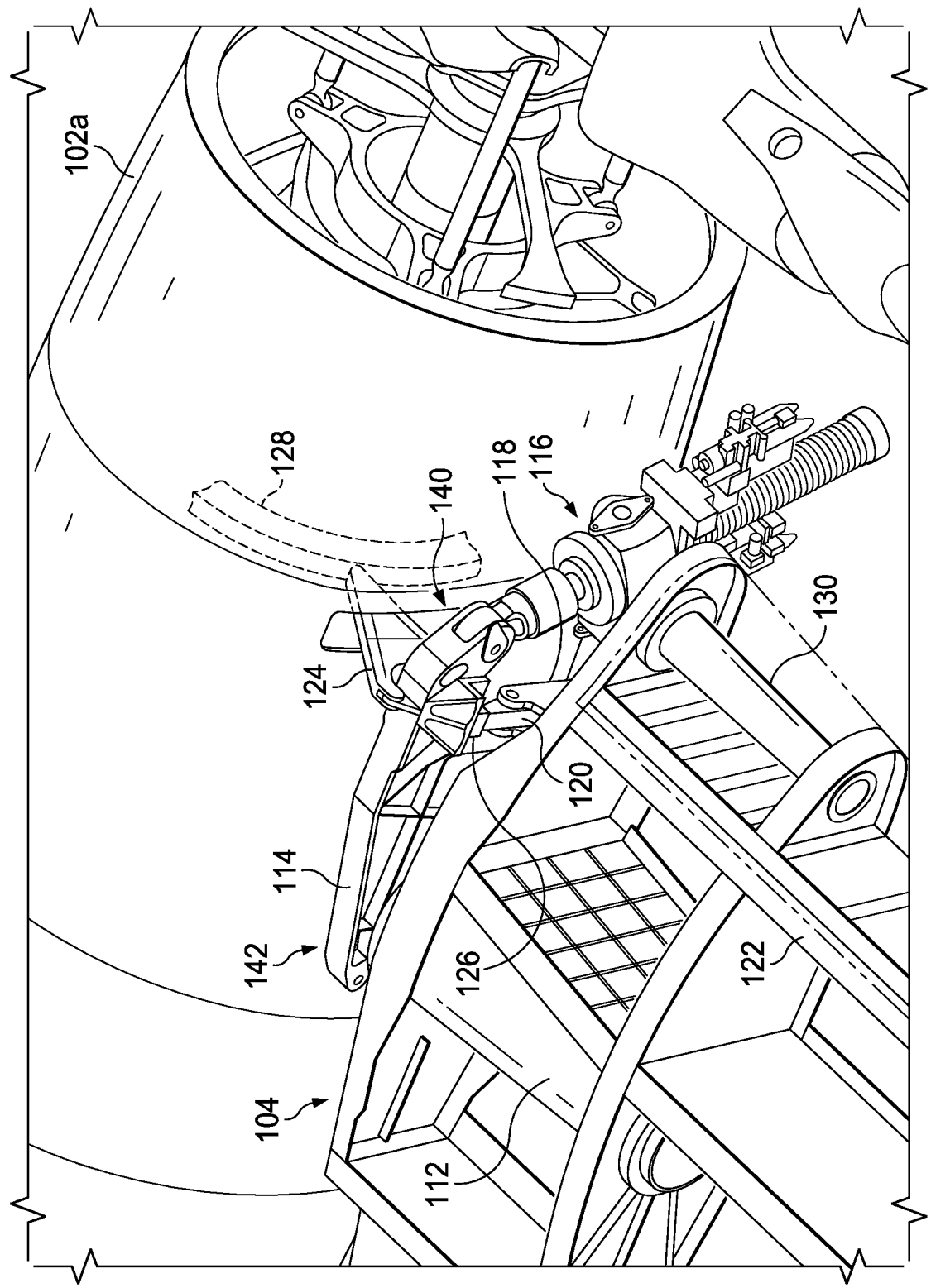
FIG. 3 illustrates an example portion of a tiltrotor aircraft in accordance with certain embodiments.
Figure 9:
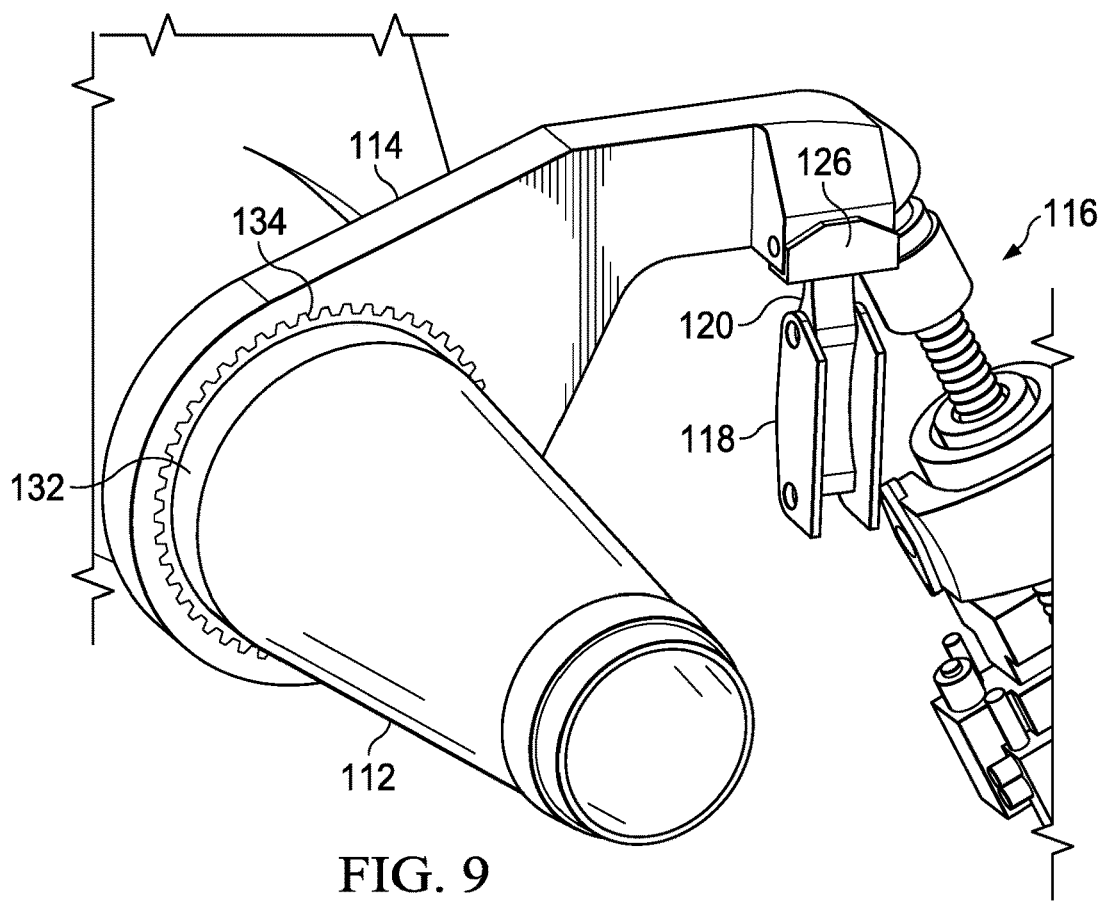
FIG. 9 illustrates an example portion of a tiltrotor aircraft in accordance with certain embodiments.
Figure 10:
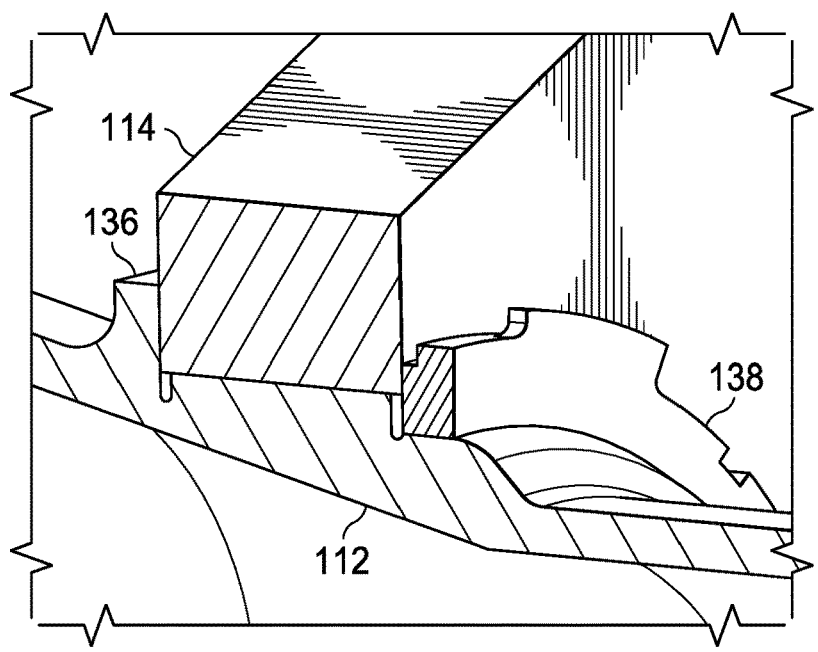
FIG. 10 illustrates an example portion of a tiltrotor aircraft in accordance with certain embodiments.

Turning to FIG. 3, FIG. 3 illustrates a partial cut away view of a portion of tiltrotor aircraft 100. Tiltrotor aircraft 100 can include pylon 102a, wing 104, spindle 112, actuator arm 114, actuator 116, a down stop 118, and a down stop striker 120. Actuator arm 114 can include a first end 140 and a second end 142. First end 140 of actuator arm 114 can be coupled to actuator 116 using a pivot pin, clevis fastener, or some other means that can secure first end 140 of actuator arm 114 to actuator 116. Second end 142 of actuator arm 114 can be coupled to spindle 112 using one or more bolted joints, splines (as illustrated in FIG. 9), a securing ridge and/or securing mechanism (as illustrated in FIG. 10), a housing and pin configuration, or some other means for securing second end 142 of actuator arm 114 to spindle 112.

Wing 104 can include a portion of spindle 112 and a forward spar 122. Down stop 118 can be securely attached to wing 104. In an example, wing 104 can include three or more spars and forward spar 122 can be the most forward spar located on a front portion of wing 104. In some examples, actuator 116 can be located in front of forward spar 122. Actuator 116 can be at least partially supported by an actuator support 130 also located in front of forward spar 122. In an example, actuator 116 can be driven by an electric actuator drive to rotate about an actuator axis. In other examples, a wide variety of types of actuator drives may be used, including drives using hydraulic power or electric motors.

Actuator arm 114 can include a down stop block 126. Down stop block 126 can be configured to align with and be supported by down stop striker 120 to help mitigate downward load. In addition, actuator arm 114 can be coupled to pylon 102a using horizontal support 124. Horizontal support 124 can be coupled to a support frame 128 of pylon 102a. Horizontal support 124 can help mitigate lateral or inboard/outboard load and help keep pylon 102a from shaking or otherwise excessively moving inboard and outboard. In an example, down stop block 126 on down stop striker 120 and horizontal support 124 can help separate the vertical load path of the forces from pylon 102a from the lateral load path of the forces from pylon 102a. More specifically, horizontal support 124 can react to inboard/outboard loads on actuator arm 114 but almost no load vertically. Down stop block 126 can react to vertical loads on actuator arm 114 but almost no or very little inboard/outboard loads. By using horizontal support 124 to help isolate inboard/outboard loads and down stop block 126 to help isolate vertical loads, the stiffness of wing 104 and pylon 102a can be tuned vertically and laterally to help meet structural dynamics requirements. Down stop block 126 on down stop striker 120 can be pre-loaded with about five thousand (5,000) pounds of force to help keep down stop block 126 on down stop striker 120 and keep pylon 102a relatively stable while tiltrotor aircraft 100 is in aircraft mode (illustrated in FIGS. 1C and 1D).

Figure 4A:
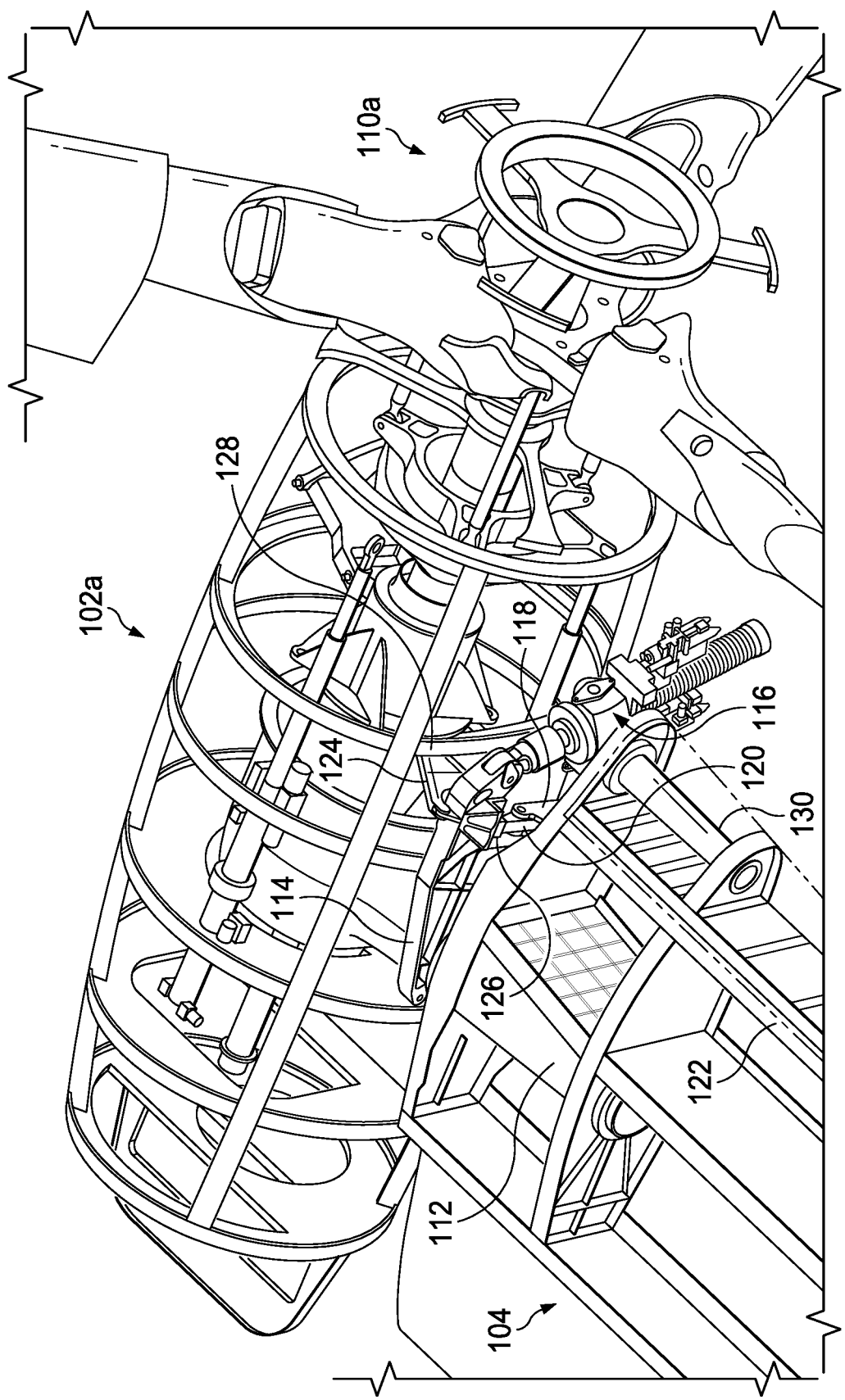
FIG. 4A illustrates an example portion of a tiltrotor aircraft in accordance with certain embodiments.

Turning to FIG. 4A, FIG. 4A illustrates a cut away view of a portion of tiltrotor aircraft 100. Tiltrotor aircraft 100 can include pylon 102a, wing 104, spindle 112, actuator arm 114, actuator 116, down stop 118, and down stop striker 120. Pylon 102a can include rotor system 110a. Actuator arm 114 can include down stop block 126. Wing 104 can include forward spar 122. Actuator 116 can be at least partially supported by actuator support 130 inside of wing 104 and in front of forward spar 122. Actuator arm 114 can be coupled to support frame 128 of pylon 102a using horizontal support 124. Support frame 128 can be coupled to a frame structure or secure structure of pylon 102a. Spindle 112 can extend from wing 104 into pylon 102a.

Figure 4B:
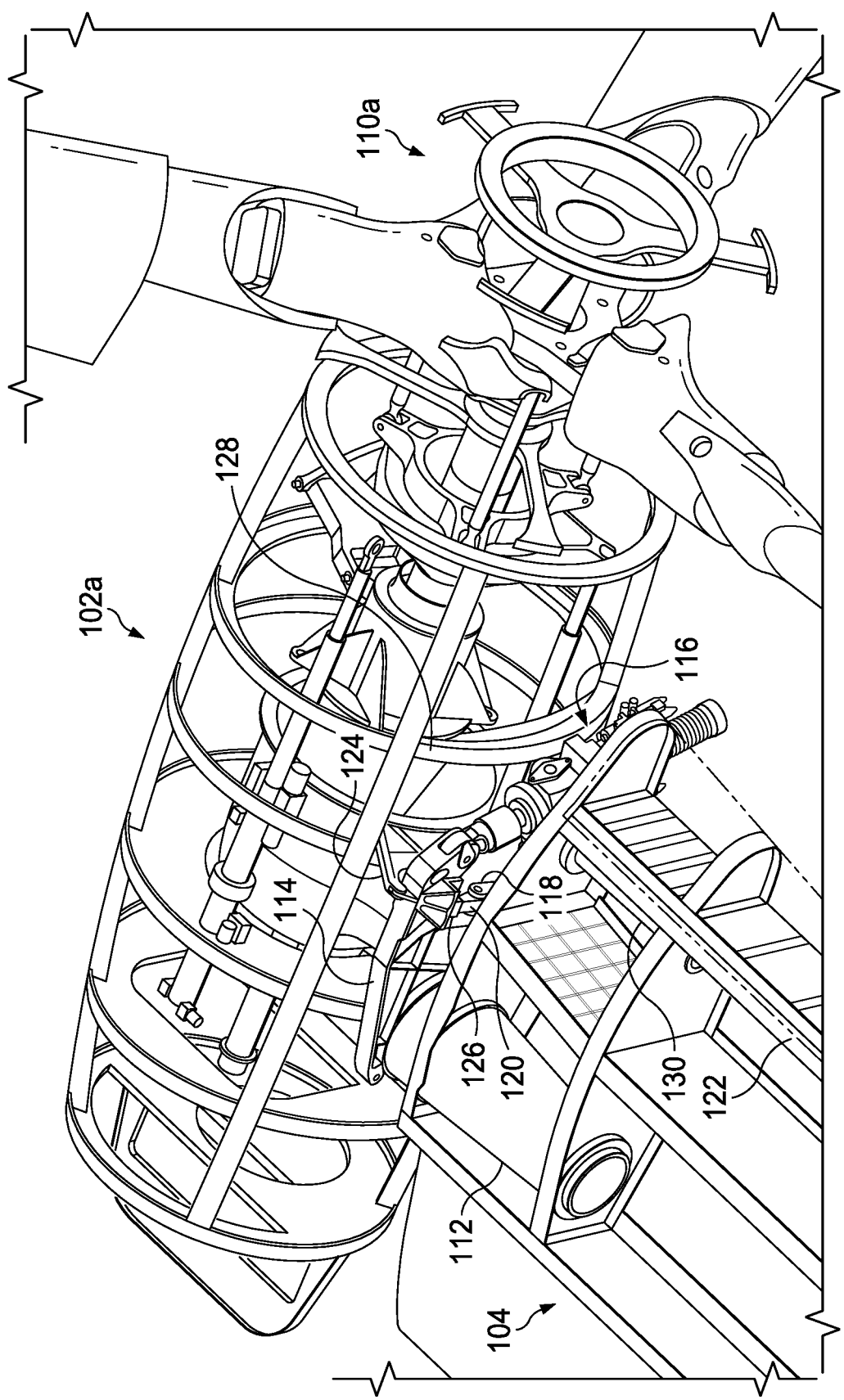
FIG. 4B illustrates an example portion of a tiltrotor aircraft in accordance with certain embodiments.

Turning to FIG. 4B, FIG. 4B illustrates a cut away view of a portion of tiltrotor aircraft 100. Tiltrotor aircraft 100 can include pylon 102a, wing 104, spindle 112, actuator arm 114, actuator 116, down stop 118, and down stop striker 120. Pylon 102a can include rotor system 110a. Actuator arm 114 can include down stop block 126. Wing 104 can include forward spar 122. Actuator 116 can be at least partially supported by actuator support 130 inside of wing 104 and behind forward spar 122. Actuator arm 114 can be coupled to support frame 128 of pylon 102a using horizontal support 124. Support frame 128 can be coupled to a frame structure or secure structure of pylon 102a. Spindle 112 can extend from wing 104 into pylon 102a.

Figure 5:
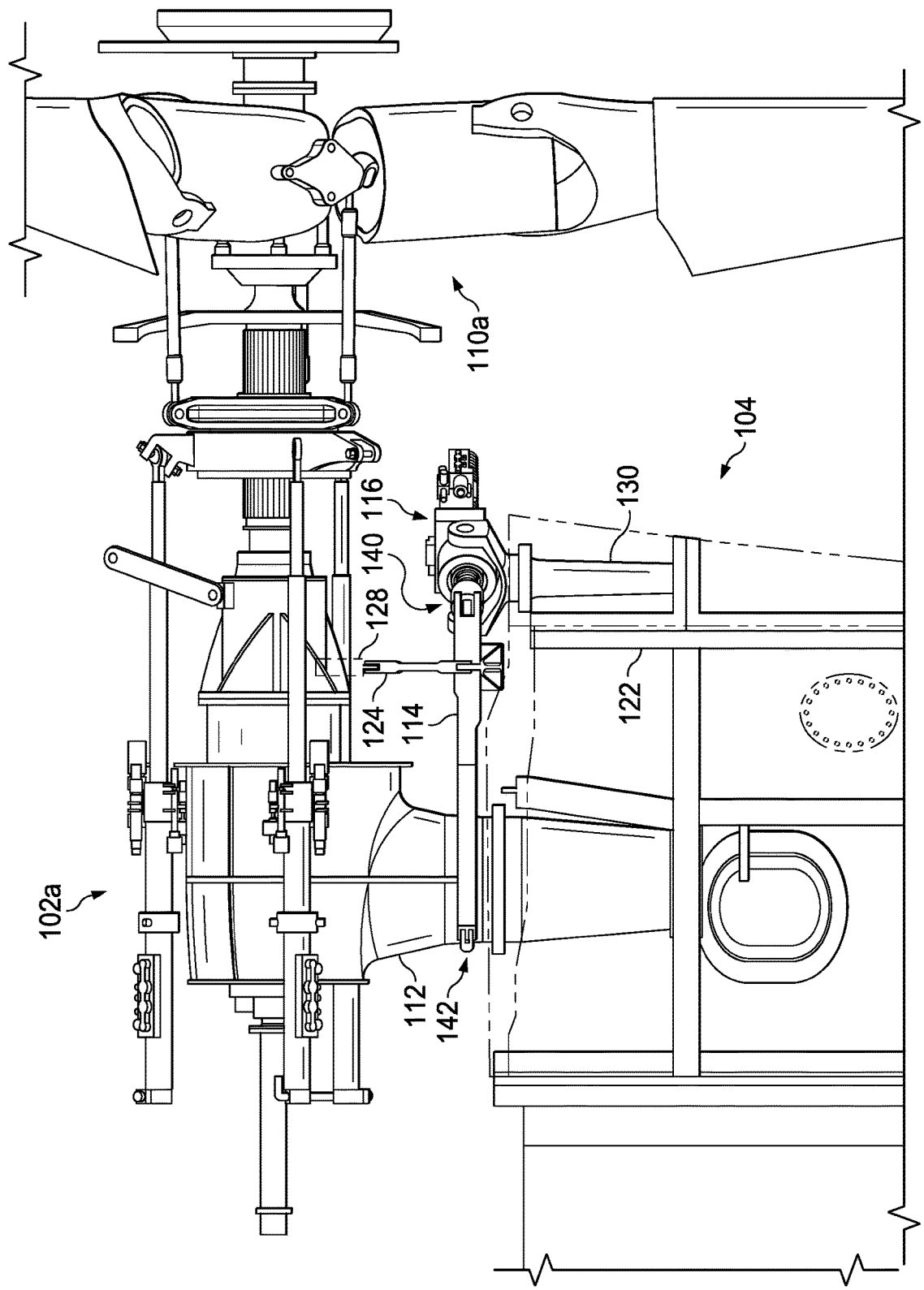
FIG. 5 illustrates an example portion of a tiltrotor aircraft in accordance with certain embodiments.

Turning to FIG. 5, FIG. 5 illustrates a simplified cut away view of a portion of tiltrotor aircraft 100. Tiltrotor aircraft 100 can include pylon 102a, wing 104, spindle 112, actuator arm 114, and actuator 116. Pylon 102a can include rotor system 110a. Wing 104 can include forward spar 122. Actuator arm 114 can be coupled to support frame 128 of pylon 102a using horizontal support 124. Actuator 116 can be at least partially supported by actuator support 130 inside of wing 104 and in front of forward spar 122. In an example, actuator 116 can be relatively close to wing 104. In a specific example, actuator 116 is about one-half (0.5) of an inch to about five (5) inches from wing 104. In another specific example, actuator 116 is about 0.75 to about 1.25 inches from wing 104. In yet another specific example, actuator 116 is about one (1) inch from wing 104. In addition, the area where actuator arm 114 couples with spindle 112 can also be relatively close to wing 104 and in the same plane as actuator 116. In a specific example, actuator arm 114 is about one-half (0.5) of an inch to about five (5) inches from wing 104. In another specific example, actuator arm 114 is about 0.75 to about 1.25 inches from wing 104. In yet another specific example, actuator arm is about one (1) inch from wing 104.

Figure 6A:
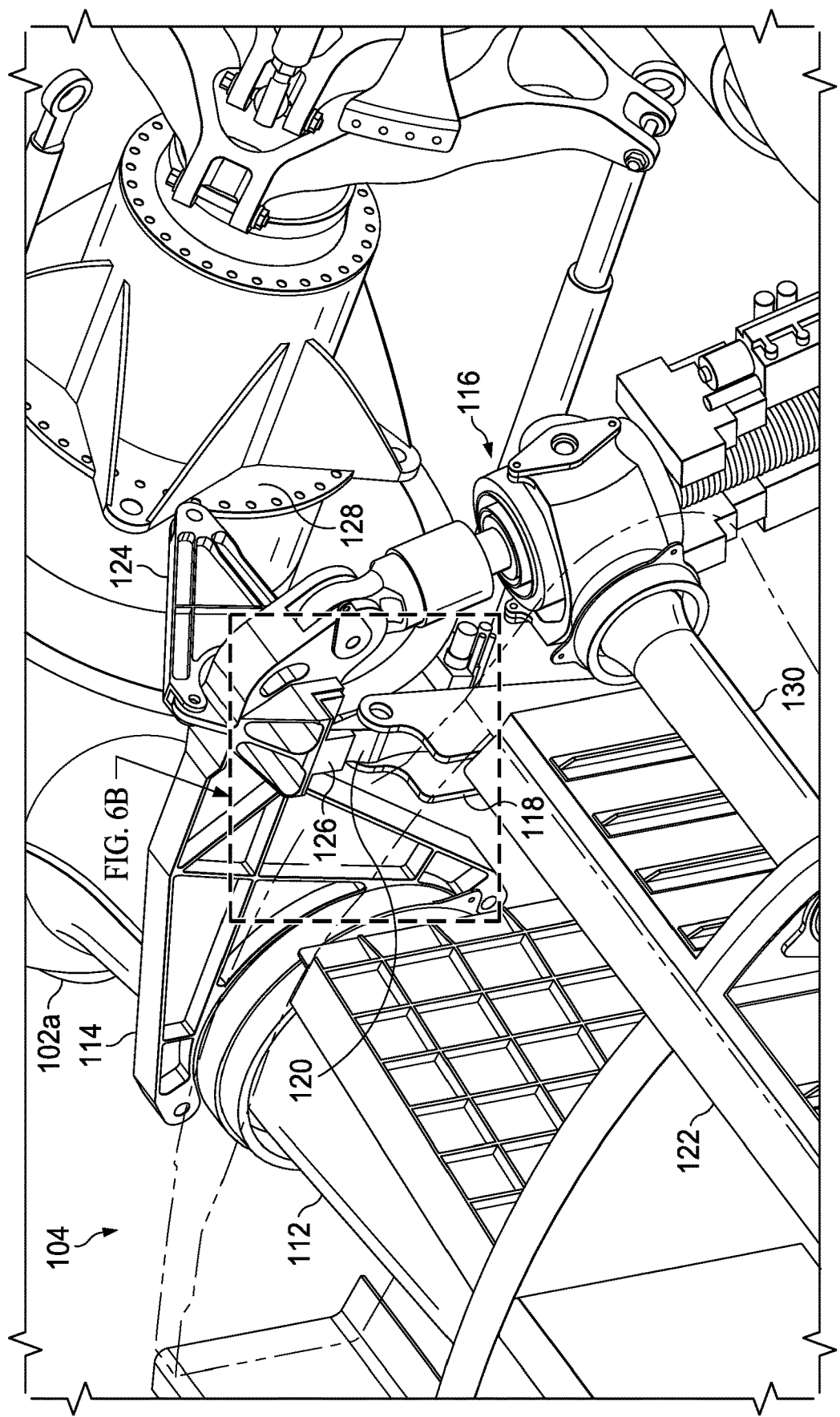
FIG. 6A illustrates an example portion of a tiltrotor aircraft in accordance with certain embodiments.

Turning to FIG. 6A, FIG. 6A illustrates a cut away view of a portion of tiltrotor aircraft 100. Tiltrotor aircraft 100 can include pylon 102a, wing 104, spindle 112, actuator arm 114, and actuator 116. Wing 104 can include forward spar 122. Actuator arm 114 can be coupled to support frame 128 of pylon 102a using horizontal support 124. Actuator 116 can be at least partially supported by actuator support 130 inside of wing 104 and in front of forward spar 122. In an example, down stop 118 and down stop striker 120 can be located proximate to forward spar 122 on an outside portion of wing 104. The top of down stop striker 120 can have a shaped profile. Down stop block 126 can have a mating shaped profile such that down stop block 126 can be positioned over down stop striker 120. In a specific example, the center of down stop 118 is about twenty (20) inches to about twenty-four (24) inches from the center of spindle 112.

Figure 6B:
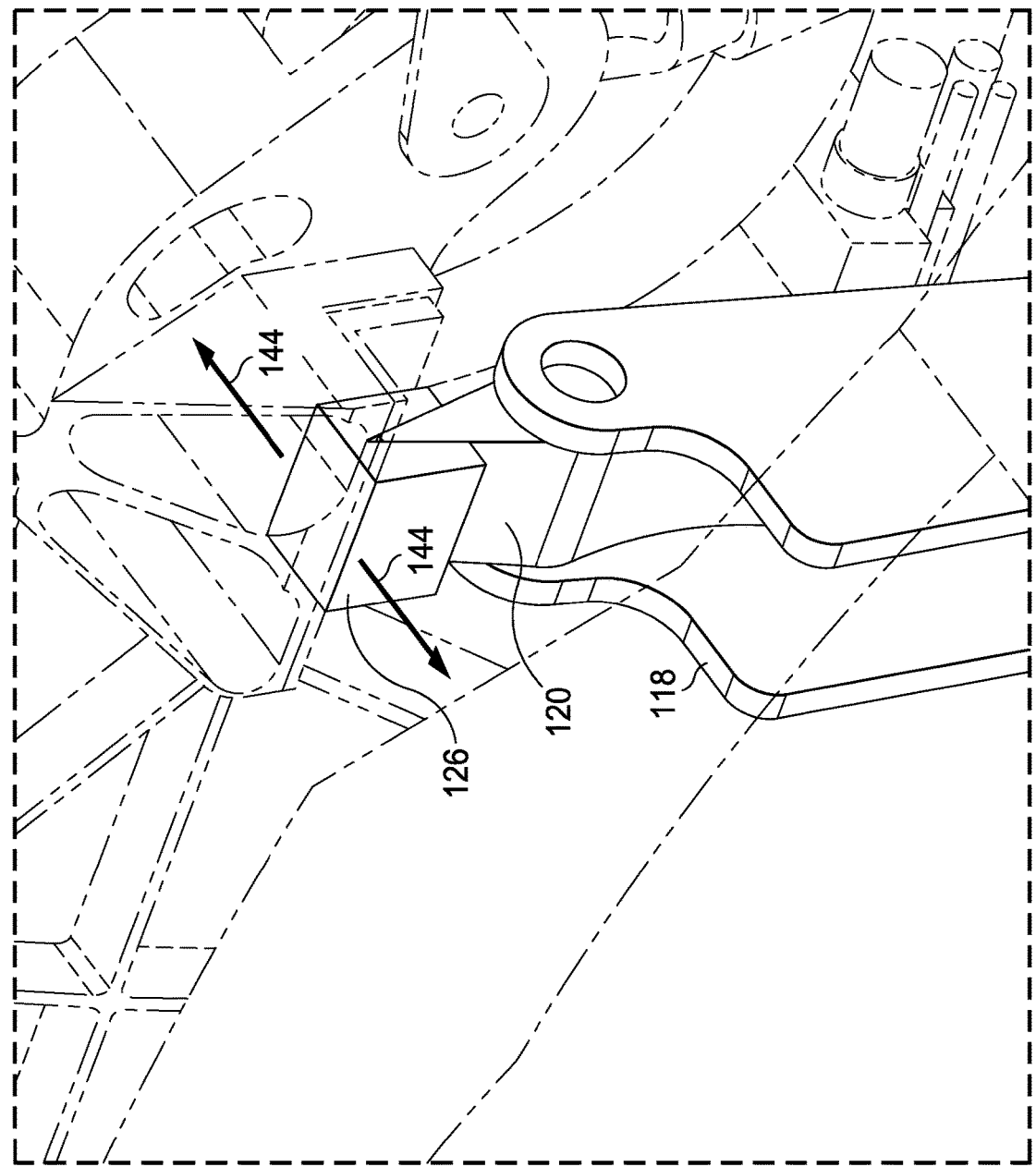
FIG. 6B illustrates an example portion of a tiltrotor aircraft in accordance with certain embodiments.

Turning to FIG. 6B, FIG. 6B illustrates a cut away view of a portion of tiltrotor aircraft 100. Tiltrotor aircraft 100 can include down stop 118, down stop striker 120, and down stop block 126. The top of down stop striker 120 can have a shaped profile. Down stop block 126 can have a mating shaped profile such that down stop block 126 can be positioned over down stop striker 120 to help mitigate lateral or inboard/outboard load and help keep pylon 102a (not shown) from shaking or otherwise excessively moving inboard/outboard. In an example, a top portion of down stop striker 120 can have a solid upside down or inverted "V" shaped profile. Down stop block 126 can have a mating hollow upside down or inverted "V" shaped profile such that down stop block 126 can be positioned over down stop striker 120. This profile can help mitigate inboard/outboard force 144 and helps to isolate inboard/outboard force 144 to horizontal support 124 as the profile helps to keep down stop block 126 from moving in the direction of inboard/outboard force 144. As a result, down stop striker 120 and down stop block 126 can react to vertical loads on actuator arm 114 (not shown).

Figure 7:
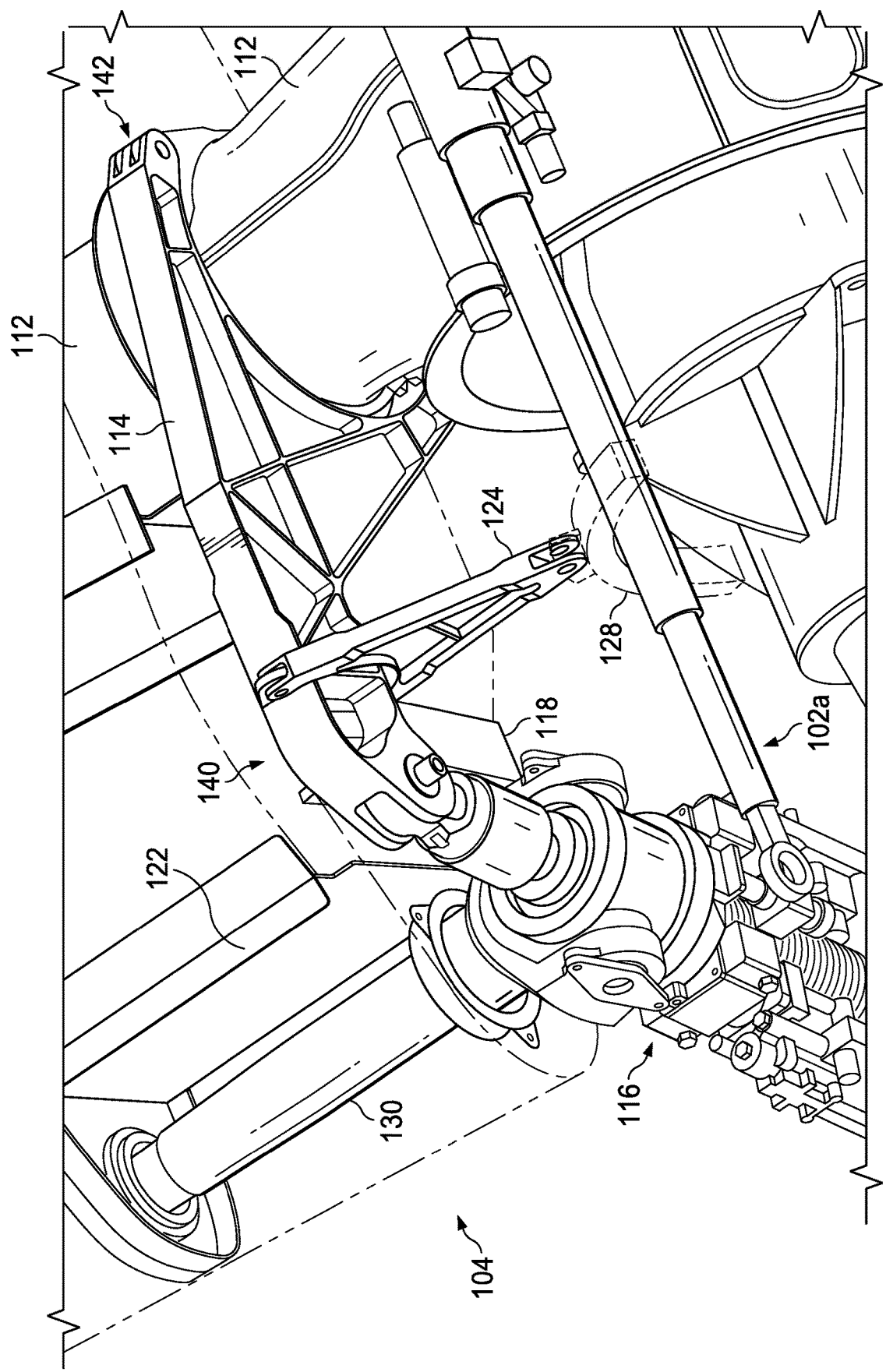
FIG. 7 illustrates an example portion of a tiltrotor aircraft in accordance with certain embodiments.

Turning to FIG. 7, FIG. 7 illustrates a simplified cut away view of a portion of tiltrotor aircraft 100. Tiltrotor aircraft 100 can include pylon 102a, wing 104, spindle 112, actuator arm 114, and actuator 116. Wing 104 can include forward spar 122. Actuator arm 114 can be coupled to support frame 128 of pylon 102a using horizontal support 124. Spindle 112 can extend from wing 104 into pylon 102a. Actuator 116 can be at least partially supported by wing 104 using actuator support 130 located in front of forward spar 122. Down stop 118 can be securely attached to wing 104. In an example, down stop 118 can be located as close to actuator 116 as possible to provide a stiff load path and impart loads over a smaller area. In addition, down stop 118 and actuator 116 can be located as far forward as possible, relative to a center of wing 104. This helps reduce reaction loads on down stop 118 and actuator 116 as the closer down stop 118 and actuator 116 are to the center of gravity of pylon 102a, the more the reaction loads decrease.

Figure 8A:
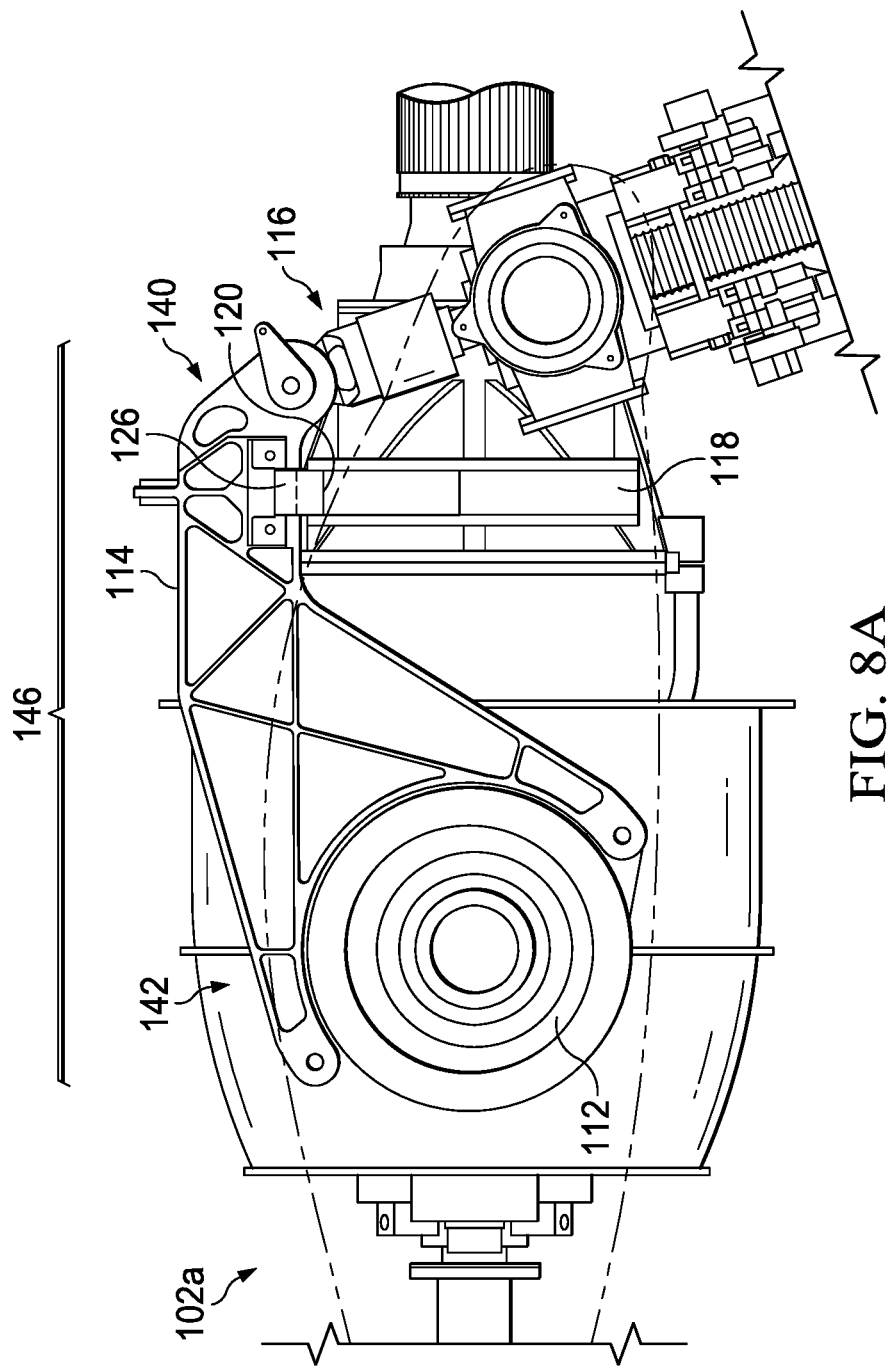
FIGS. 8A and 8B illustrate an example portion of a tiltrotor aircraft in accordance with certain embodiments.

Turning to FIG. 8A, FIG. 8A illustrates a side cut away side view of a portion of tiltrotor aircraft 100. Tiltrotor aircraft 100 can include pylon 102a, spindle 112, actuator arm 114, and actuator 116. Down stop 118 can be securely attached to wing 104 (not shown). Down stop striker 120 can be located in at least a portion of down stop 118. In an example, a top portion of down stop striker 120 can have a solid upside down or inverted "V" shaped profile. Down stop block 126 can have a mating hollow upside down or inverted "V" shaped profile such that down stop block 126 can be positioned over down stop striker 120. Actuator arm 114 can have a total actuator arm length 146 no longer than about thirty-five (35) inches in total length. In a specific example, actuator arm length 146 is between about thirty-two (32) inches to about thirty-four (34) inches in total length.

Figure 8B:
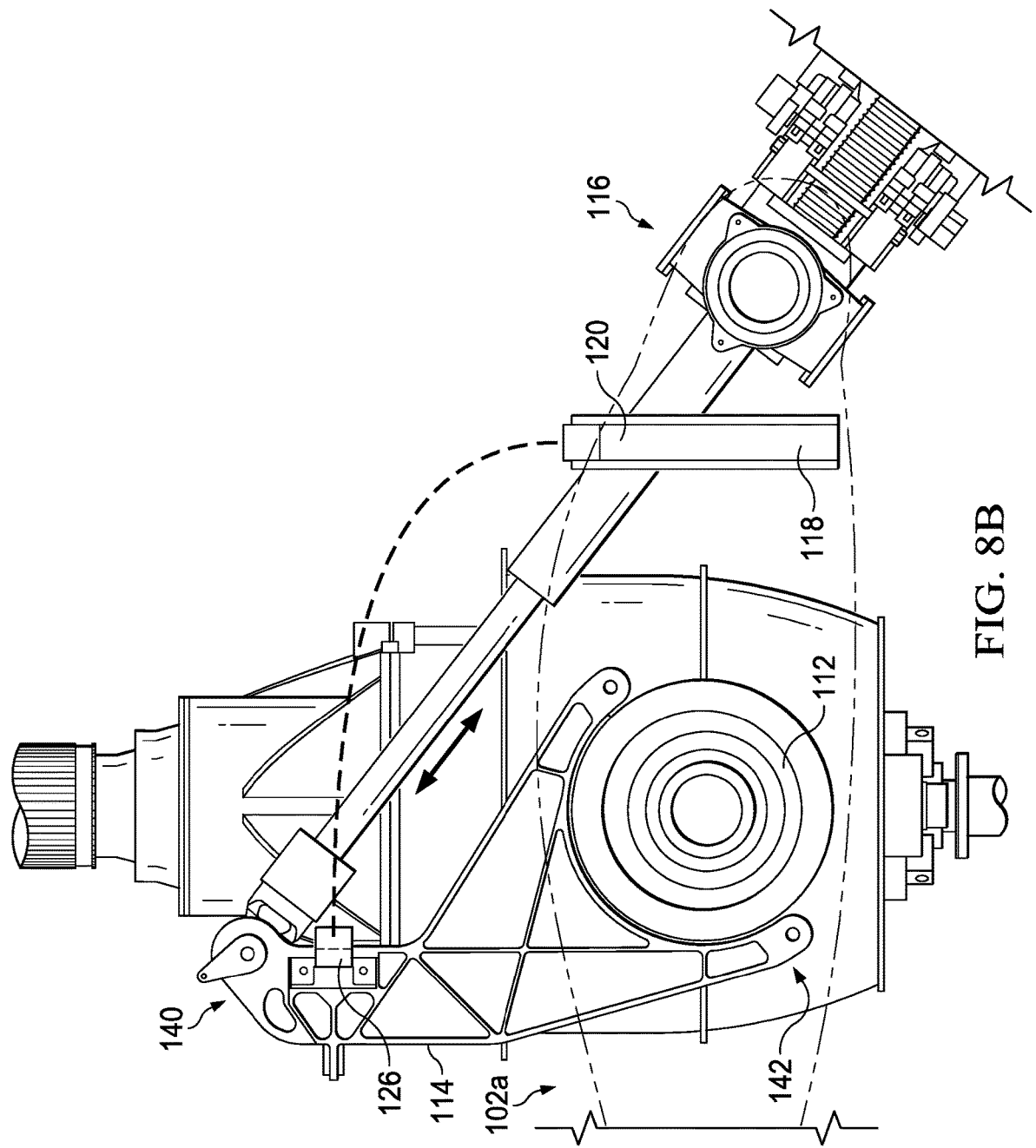

Turning to FIG. 8B, FIG. 8B illustrates a side cut away view of a portion of tiltrotor aircraft 100. Tiltrotor aircraft 100 can include pylon 102a, spindle 112, actuator arm 114, and actuator 116. Down stop 118 can be securely attached to wing 104 (not shown). As illustrated in FIG. 8B, actuator 116 has been extended and pushed actuator arm 114 away from actuator 116. As actuator arm 114 is pushed away from actuator 116, actuator arm 114 rotates spindle 112. Spindle 112 is coupled to pylon 102a and as spindle 112 rotates, pylon 102a also rotates.

Turning to FIG. 9, FIG. 9 illustrates a cut away view of a portion of tiltrotor aircraft 100. Tiltrotor aircraft 100 can include spindle 112, actuator arm 114, and actuator 116. Down stop 118 can be securely attached to wing 104 (not shown). In an example, actuator arm 114 can slide over spindle 112. Spindle 112 can include a splined portion 132. Actuator arm 114 can include mating grooves 134 that can mate or couple with splined portion 132 to help transfer torque from actuator arm 114 to spindle 112 and help rotate spindle 112 and pylon 102a (not shown).

Turning to FIG. 10, FIG. 10 illustrates a cut away view of a portion of tiltrotor aircraft 100. Tiltrotor aircraft 100 can include spindle 112 and actuator arm 114. In an example, spindle 112 can include an actuator arm securing ridge 136. When actuator arm 114 is slid or otherwise positioned on spindle 112, an actuator arm securing mechanism 138 can help hold actuator arm 114 against actuator arm securing ridge 136. In an example, actuator arm securing mechanism 138 can be a spanner nut or some other securing mechanism that helps to secure actuator arm 114 to spindle 112. In other examples, actuator arm 114 can be coupled to spindle 112 using one or more bolted joints, a housing and pin configuration, or some other means for securing actuator arm 114 to spindle 112.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

It is important to note that the drawings illustrate pylon 102a, spindle 112, actuator arm 114, actuator 116, down stop 118, etc. on the left side of wing 104 of tiltrotor aircraft 100. It is to be understood that pylon 102a, spindle 112, actuator arm 114, actuator 116, down stop 118, etc. are equally adapted for placement on the right side of wing 104 of tiltrotor aircraft 100 and that pylon 102a, spindle 112, actuator arm 114, actuator 116, down stop 118, etc. on the right side of wing 104 would be a mirror image of pylon 102a, spindle 112, actuator arm 114, actuator 116, down stop 118, etc. on the left side of wing 104. In addition, pylons 102a and 102b may be rotatably attached to an aircraft at locations other than at the ends of wings 104. For example, a pylon may be attached to the fuselage or may be located in an inboard portion of a wing.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A tiltrotor aircraft comprising:
a rotor system;
a pylon coupled to the rotor system;
a spindle coupled to the pylon;
an actuator arm, wherein the actuator arm has a first end, a second end, and a down stop block, wherein the first end is coupled to the spindle; and
an actuator coupled to the second end of the actuator arm, wherein the actuator causes the actuator arm to rotate the spindle to rotate the pylon and the rotor system.

2. The tiltrotor aircraft of claim 1, wherein the spindle is partially located in a wing of the tiltrotor aircraft and the actuator arm and actuator are outside of the wing.

3. The tiltrotor aircraft of claim 2, wherein the actuator is positioned forward of a forward spar of the wing.

4. The tiltrotor aircraft of claim 2, wherein the actuator arm is between one-half (0.5) of an inch and five (5) inches from the wing.

5. The tiltrotor aircraft of claim 2, wherein tiltrotor aircraft further comprises:

a down stop mounted to an end of the wing, wherein the down stop includes a down stop striker, and wherein the down stop block has a profile that mates with a profile of the down stop striker.

6. The tiltrotor aircraft of claim 5, wherein the profile of the down stop block is an inverted "V" profile.

7. The tiltrotor aircraft of claim 5, wherein the actuator arm is coupled to the rotor system using a horizontal support and the horizontal support reacts to inboard/outboard loads and the down stop striker and down stop block reacts to vertical loads.

8. The tiltrotor aircraft of claim 2, further comprising:
a down stop mounted to an end of the wing, wherein the down stop includes a down stop striker configured to align with and support the down stop block to help mitigate downward loads.

9. The tiltrotor aircraft of claim 8, wherein the down stop block on the down stop striker helps to isolate vertical loads from the pylon.

10. The tiltrotor aircraft of claim 1, wherein the actuator arm and the spindle are splined.

11. A rotation mechanism for a pylon coupled to a rotor system of a tiltrotor aircraft, the rotation mechanism comprising:
a spindle coupled to the pylon;
an actuator arm, wherein the actuator arm has a first end, a second end, and a down stop block, wherein the first end is coupled to the spindle; and
an actuator coupled to the second end of the actuator arm, wherein the actuator causes the actuator arm to rotate the spindle, causing the spindle to rotate the pylon and the rotor system.

12. The rotation mechanism of claim 11, wherein the spindle is partially located in a wing of the tiltrotor aircraft and the actuator arm and actuator are outside of the wing, wherein the actuator is in front of a forward spar of the wing.

13. The rotation mechanism of claim 12, wherein the actuator arm is one-half (0.5) of an inch to five (5) inches from the wing.

14. The rotation mechanism of claim 11, further comprising:
a down stop, wherein the down stop includes a down stop striker, and wherein the actuator arm includes a down stop block that has a profile that mates with a profile of the down stop striker.

15. The rotation mechanism of claim 14, wherein a center of the down stop is twenty (20) inches to twenty-four (24) inches from a center of the spindle.

16. The rotation mechanism of claim 14, wherein the profile of the down stop block is an inverted "V" profile.

17. A method comprising:
rotating a rotor system of a tiltrotor aircraft from an airplane configuration to a helicopter configuration, wherein the tiltrotor aircraft includes:
a pylon coupled to the rotor system;
a spindle coupled to the pylon;
an actuator arm, wherein the actuator arm has a first end, a second end, and a down stop block, wherein the first end is coupled to the spindle; and
an actuator coupled to the second end of the actuator arm, wherein the actuator causes the actuator arm to rotate the spindle, causing the spindle to rotate the pylon and the rotor system from the airplane configuration to the helicopter configuration.

18. The method of claim 17, wherein the spindle is partially located in a wing of the tiltrotor aircraft and the actuator arm and the actuator are outside and one-half (0.5)

of an inch to five (5) inches from the wing, wherein the actuator is in front of a forward spar of the wing.

19. The method of claim 17, further comprising:
rotating the rotor system of the tiltrotor aircraft from the helicopter configuration to the airplane configuration, wherein the tiltrotor aircraft further includes:
a down stop, wherein the down stop includes a down stop striker, and wherein the actuator arm includes a down stop block that has a profile that mates with a profile of the down stop striker.

20. The method of claim 19, wherein a center of the down stop is twenty (20) inches to twenty-four (24) inches from a center of the spindle.

* * * * *